(12) United States Patent
Hemmings et al.

(10) Patent No.: US 6,916,863 B2
(45) Date of Patent: Jul. 12, 2005

(54) FILLER COMPRISING FLY ASH FOR USE IN POLYMER COMPOSITES

(75) Inventors: Raymond T. Hemmings, Kennesaw, GA (US); Russell L. Hill, San Antonio, TX (US); Bruce J. Cornelius, Waterdown (CA)

(73) Assignee: Boral Material Technologies, Inc., San Antonio, TX (US)

(*) Notice: Subject to any disclaimer, the term of this patent is extended or adjusted under 35 U.S.C. 154(b) by 211 days.

(21) Appl. No.: 10/225,958

(22) Filed: Aug. 22, 2002

(65) Prior Publication Data

US 2003/0032707 A1 Feb. 13, 2003

Related U.S. Application Data

(63) Continuation-in-part of application No. 09/993,316, filed on Nov. 14, 2001, now Pat. No. 6,695,902.
(60) Provisional application No. 60/248,518, filed on Nov. 14, 2000.

(51) Int. Cl.$^7$ .............................. C08K 7/26; C08K 3/26
(52) U.S. Cl. ....................... 523/218; 524/425; 524/426; 524/427
(58) Field of Search ........................... 523/218; 524/2–8, 524/425–427

(56) References Cited

U.S. PATENT DOCUMENTS

| | | |
|---|---|---|
| 3,769,053 A | 10/1973 | Pennachetti et al. |
| 3,769,054 A | 10/1973 | Pennachetti et al. |
| 3,991,005 A | 11/1976 | Wallace |
| 4,013,616 A | 3/1977 | Wallace |
| 4,121,945 A | 10/1978 | Hurst et al. |
| 4,268,320 A | 5/1981 | Klingaman et al. |
| 4,294,750 A | 10/1981 | Klingaman et al. |
| 4,486,211 A | 12/1984 | Monaghan |
| 4,490,493 A | 12/1984 | Mikols |
| 4,661,533 A | 4/1987 | Stobby |
| 4,705,409 A | 11/1987 | Trerice |
| 4,714,722 A | 12/1987 | Najvar et al. |
| 4,992,102 A | 2/1991 | Barbour |
| 5,087,545 A | 2/1992 | Hagenbach |
| 5,160,539 A | 11/1992 | Cochran |
| 5,299,692 A | 4/1994 | Nelson et al. |
| 5,302,634 A | 4/1994 | Mushovic |
| 5,391,417 A | 2/1995 | Pike |
| 5,399,194 A | 3/1995 | Cochran et al. |
| 5,508,315 A * | 4/1996 | Mushovic ................... 521/122 |
| 5,518,996 A * | 5/1996 | Maroy et al. ............... 507/100 |
| 5,536,310 A | 7/1996 | Brook et al. |
| 5,565,239 A | 10/1996 | Pike |
| 5,624,491 A | 4/1997 | Liskowitz et al. |
| 5,681,384 A | 10/1997 | Liskowitz et al. |
| 5,759,730 A * | 6/1998 | Hermansen et al. ........ 438/106 |
| 5,772,752 A | 6/1998 | Liskowitz et al. |
| 5,776,244 A | 7/1998 | Ahrens |
| 5,814,256 A | 9/1998 | Greve et al. |
| 5,817,230 A | 10/1998 | Groppo, Jr. et al. |
| 5,845,783 A | 12/1998 | Smith |
| 5,849,075 A | 12/1998 | Hopkins et al. |
| 5,887,724 A | 3/1999 | Weyand et al. |
| 5,935,885 A | 8/1999 | Hnat et al. |
| 6,096,401 A | 8/2000 | Jenkines |
| 6,139,960 A | 10/2000 | Styron et al. |
| 6,242,098 B1 | 6/2001 | Styron et al. |

FOREIGN PATENT DOCUMENTS

| | | |
|---|---|---|
| JP | 4-346884 | 12/1992 |
| JP | 6-126252 | 5/1994 |
| JP | 6-307606 | 11/1994 |
| JP | 7-060142 | 3/1995 |
| JP | 9-30857 | 2/1997 |
| JP | 10-029882 | 2/1998 |
| WO | WO 95/27685 | 10/1995 |
| WO | WO 95/33571 | 12/1995 |
| WO | WO 97/21640 | 6/1997 |
| WO | WO 99/37592 | 7/1999 |
| WO | WO 01/23317 A1 | 4/2001 |

OTHER PUBLICATIONS

Huang et al., "Processed Low NO$_x$ Fly Ash as a Filler in Plastics," Proceedings of Twelfth International Symposium on Management & Use of Coal Combustion Byproducts (CCBs), Jan. 26–30, 1997, Orlando, Florida, USA.

Yih et al., "Recovery of Cenospheres and Application to the Manufacture of Insulation Materials," *Journal of the Chin.I.Ch.E.*, vol. 19, No. 1, 1988, pp. 23–29.

G. Dinelli, "Thermal By–Products Treatment and Valorization," *Chemicke Listy*, vol. 89, No. 3, Mar. 1995, pp. 137–143.

"Fly Ash Shows Promise as Plastics Filler," C&EN, May 8, 1978, pp. 29–30.

Roger L. Kaas, "Residual Fly Ash Can Replace Talc and Kaolin as Polypropylene Filler," *Plastics Design & Processing*, Nov. 1978, pp. 49–53.

G. J. Jablonski, "Fly Ash Utilization as an Extender in Plastics and Paints," International Ash Utilization Symposium, Oct. 1987, pp. 38.1–38.15.

(Continued)

*Primary Examiner*—Peter Szekely
(74) *Attorney, Agent, or Firm*—Alston & Bird LLP

(57) ABSTRACT

The present invention is a fly ash filler or filler blend having a particle size distribution with at least three modes that can be combined with a polymer at higher filler loadings to produce a filled polymer for polymer composites that, in many cases, can produce improved mechanical properties for the polymer composites over polymer composites using conventional fillers. As a result, superior polymer composites (e.g. those used in carpet backing) can be produced at a lower cost than conventional polymer composites. The present invention also includes a method for producing a polymer composite, comprising the steps of combining a polymer with a fly ash filler or a filler blend having a particle size distribution with at least three modes to produce a filled polymer and producing a polymer composite with the resulting filled polymer. The present invention further includes a method of determining what fly ashes can be used as fillers for polymer composites.

44 Claims, No Drawings

OTHER PUBLICATIONS

Borrachero, P.J. et al., "Improvement of Portland Cement/Fly Ash Mortars Strength Using Classified Fly Ashes," Proceedings of the International Conference on Environmental Implications of Construction with Waste Materials, vol. 2, 1994, pp. 563–570.

Berry, E.E., et al., "Enhanced Resource Recovery by Beneficiation and Direct Acid Leaching of Fly Ash<" Fly Ash and Coal Conversion By–Products: Characterization, Utilization and Disposal III Symposium held Dec. 1–3, 1986, Boston, MA, pp. 365–380.

Abstract: Shaw, Donald E., "The Use of Fly Ash in the Manufacture of Asphalt Shingles," Jun. 2002, pp. 1–13.

Berry, E.E., et al., "Acid–Leached Fly Ash as a Spherical Filler in Polymer Composites," $42^{nd}$ Annual Conference, Composites Institutes, The Society of the Plastics Industry, Inc., Feb. 2–6, 1987.

Hemmings, R.T., et al., "Evaluation of Plastic Filler Applications for Leached Fly Ash," Electric Power Research Institute; Sep. 1986, Ontario Research Foundation, Mississauga, Ontario, Canada.

Plowman, C., et al.; "The Use of Pulverized Fuel Ash as a Filler in Plastics," Conference Proceedings for the Ash Tech '84 Second International Conference on Ash Technology and Marketing, Barbican Centre, London, Sep. 16–21, 1984; pp. 663–670.

Monzó, J. Payá, et al., "Early–Strength Development of Portland Cement Mortars Containing Air Classified Fly Ashes," Cement and Concrete Research, 1995, pp. 449–456, vol. 25, No. 2, Elsevier Science Ltd., United States of America.

Berry, E.E., et al.; "Investigation of Some New Spherical Fillers," Ontario Research Foundation, Nov. 1986; pp. 1–24; Canada.

Berry, E. E., et al., "Beneficiated Fly Ash: Hydration, Microstructure, and Strength Development in Portland Cement Systems," Fly Ash, Silica Fume, Slag, and Natural Pozzolans in Concrete, Proceedings Third International Conference, Trondheim, Norway, 1989; vol. 1; American Concrete Institute, Detroit.

Yih et al., "Recovery of Cenospheres and Application to the Manufacture of Insulation Materials," Journal of the Chin 1 Ch E, vol. 19, No. 1, 1988, pp. 23–29.

Ukita, K. et al., "Properties of High Strength Concrete Using 'Classified Fly Ash'," $4^{th}$ International Conference on Fly Ash, Silica Fume, Slag and Natural Pozzolans in Concrete, May, 1992, pp. 37–47.

Plowman, C., et al.; "The Use of Pulverized Fuel Ash as a Filler in Plastics," Conference Proceedings for the AshTech '84 Second International Conference on Ash Technology and Marketing, Barbican Centre, London, Sep. 16–21, 1984; pp. 663–670.

* cited by examiner

FILLER COMPRISING FLY ASH FOR USE IN POLYMER COMPOSITES

CROSS-REFERENCE TO RELATED APPLICATIONS

This application is a continuation-in-part application of U.S. patent application Ser. No. 09/993,316, filed Nov. 14, 2001, now U.S. Pat. No. 6,695,902 which claims the benefit of commonly owned, copending U.S. Provisional Application Ser. No. 60/248,518, filed Nov. 14, 2000.

FIELD OF THE INVENTION

The present invention relates generally to fillers for polymer composites such as those used for carpet backing, and more particularly relates to fly ash filler and filler blends for use in polymer composites and to methods for selecting or modifying a fly ash filler or filler blend for use in polymer composites.

BACKGROUND OF THE INVENTION

Polymers are used in various types of applications and often utilize a mineral filler, or extender, both to impart desired mechanical properties and to reduce raw material costs. For example, the mineral fillers typically used in polymers include calcium carbonate, kaolin, talc, mica, wollastonite, silica, glass flakes and glass spheres.

Recently, there has been an increased interest in using fly ash as a filler in polymer composites. In particular, because fly ash is a recycled material produced by the combustion of coal, fly ash qualifies as a recycled material and thus is desirable for this reason. Fly ash is also relatively inexpensive when compared to the fillers often used as fillers for polymer composites. Furthermore, it has been discovered that fly ash can be used in polymer composites without causing detriment to the mechanical properties of the polymer composites and, in many cases, improving the mechanical properties of the polymer composites.

Numerous references describe the use of fly ash in polymer composites. For example, U.S. Pat. No. 6,091,401 to Jenkines describes the use of Class F fly ash fillers in polyurethane carpet backing. Although these references describe polymer systems that can use fly ash, there is a need in the art to increase the filler loadings in polymer composites to decrease the cost of producing the polymer composites and, in many cases, to further improve the mechanical properties of the polymer composites.

SUMMARY OF THE INVENTION

The present invention provides a filler comprising fly ash that can be used in polymer composites and methods of classifying fly ash or blending a fly ash with at least one additional filler such as an additional fly ash to produce a filler for polymer composites. In particular, the filler comprising fly ash has a particle size distribution having at least three modes and can often be used at higher loadings than have previously been possible for the particular polymer composite. As shown in related U.S. application Ser. No. 09/993,316, filed Nov. 14, 2001, which is incorporated by reference herein in its entirety, the fly ash fillers of the invention can be used at higher loadings to produce greater mechanical properties in asphalt shingles, which are one type of polymer composite in accordance with the invention.

The inventors have discovered that the granulometry of the fly ash used as a filler or in filler blends for polymer composites is important to the rheological performance of the filled polymer in the production of the polymer composites and to the mechanical properties of the resulting polymer composites. In one embodiment of the invention, the polymer composite includes filled polymer comprising a polymer and a filler, the filler comprising fly ash and having a particle size distribution having at least three modes and typically having three modes. Preferably, the particle size distribution includes a first mode having a median particle diameter from 0.3 to 1.0 microns, a second mode having a median particle diameter from 10 to 25 microns, and a third mode having a median particle diameter from 40 to 80 microns. The particle size distribution also preferably includes 11–17% of the particles by volume in the first mode, 56–74% of the particles by volume in the second mode, and 12–31% of the particles by volume in the third mode. Moreover, the ratio of the volume of particles in the second and third modes to the volume of particles in the first mode is preferably from about 4.5 to about 7.5. In one embodiment, the filler consists of a fly ash having a particle size distribution having at least three modes and the filled polymer includes at least one additional filler other than the fly ash. In other words, the filled polymer includes at least one additional filler that may not be selected to produce a filler having the particle size distribution described above. The filled polymer can be used to produce various types of polymer composites including carpet backing.

In one preferred embodiment, the filler used in the filled polymer for the polymer composite comprises a blend of fly ash and at least one additional filler wherein the filler blend has a particle size distribution having at least three modes and typically having three modes. The fly ash can, for example, be a lignite coal fly ash or a subbituminous coal fly ash. Moreover, the fly ash filler can be a Class C or Class F fly ash filler. In one preferred embodiment, the at least one additional filler in the filler blend is a second fly ash. For this embodiment, the filler blend preferably comprises a high fine particle content fly ash filler (e.g. having a median particle size of 10 microns or less) and a low fine particle content fly ash filler (e.g. having a median particle size of 20 microns or greater). Alternatively, the at least one additional filler in the filler blend can be another mineral filler such as calcium carbonate. In this particular embodiment, the fly ash is preferably a high fine particle content fly ash. The filler blend can include from about 10% to about 90% by weight of the fly ash filler and from about 90% to about 10% by weight of the additional filler. In one embodiment, the filler blend comprises a first fly ash and at least one additional filler selected from the group consisting of a second fly ash and calcium carbonate, and the polymer composite comprises at least one additional filler other than the fillers included in the filler blend. In other words, the filled polymer includes at least one additional filler that may not be selected to produce a filler blend having the particle size distribution described above.

The filler blend preferably has a packing factor of at least 65% and can be loaded in the filled polymer at a filler loading of greater than 20% to about 80% percent by weight, preferably from about 30% to about 80% by weight, and more preferably from about 40% to about 80% by weight. The filler can also be loaded in the filled polymer at a filler loading of greater than 20% to about 60% percent by volume, preferably from about 30% to about 60% by volume, and more preferably from about 40% to about 60% by volume. Although various polymers can be used in the composite as discussed herein, the polymer is typically selected from the group consisting of polyethylene, polypropylene, polyvinyl chloride, nylons, epoxies, phenolics, polyesters, acrylic polymers, polyurethanes, bitumen, styrene-butadiene copolymers, acrylonitrile-butadiene-styrene copolymers and blends thereof. The polymer composites can be used in numerous applications such as in carpet backing and can be loaded in amounts, e.g., greater than 55% by weight. The present invention further includes a filler for filled polymers for polymer composites comprising a blend of fly ash and at least one additional filler and having a particle size distribution with at least three modes as discussed above.

The present invention also includes a method for producing a polymer composite, comprising combining a polymer with a filler to produce a filled polymer, the filler comprising fly ash and having a particle size distribution with at least three modes; and producing a polymer composite with the resulting filled polymer. The filler preferably has a particle size distribution having the properties discussed above. The filler can be produced in accordance with the invention by classifying a fly ash to produce a fly ash filler having a particle size distribution having at least three modes. The fly ash filler can then be combined with the polymer and at least one additional filler to produce the filled polymer. Alternatively, the filler can produced by blending fly ash and at least one additional filler and the filler blend combined with the polymer to produce the polymer composite. For example, the filler blend can be produced by blending a first fly ash and a second fly ash or by blending a fly ash and at least one additional filler other than fly ash (e.g. calcium carbonate). The filler for use in the polymer composite can also be produced by burning two or more types of coal selected from the group consisting of lignite coal, subbituminous coal and bituminous coal. In one embodiment, the filled polymer can be used to produce carpet backing.

In one particularly preferred embodiment, the present invention includes carpet backing formed of a filled polymer comprising a polymer selected from the group consisting of polyethylene, polypropylene, bitumen, styrene-butadiene copolymer, acrylonitrile-butadiene-styrene copolymer and blends thereof; and filler, the filler comprising fly ash and having a particle size distribution having at least three modes. A carpet material in accordance with this embodiment can be produced by combining a polymer selected from the group consisting of polyethylene, polypropylene, bitumen, styrene-butadiene copolymer, acrylonitrile-butadiene-styrene copolymer and blends thereof, with a filler to produce a filled polymer, the filler comprising fly ash and having a particle size distribution with at least three modes, and applying the filled polymer as a melt to a surface of a carpet material at an elevated temperature to form a backing on the carpet material. For example, the filler can be used in the filled polymer at a filler loading of greater than 55% by weight. The filled polymer can be formed into filled polymer pellets and these pellets subjected to an elevated temperature to produce a filled polymer melt that can be applied to the surface of the carpet material. The method can include the step of removing at least the fly ash particles having a particle size of greater than 250 microns prior to combining the filler with the polymer. For example, the fly ash particles having a particle size of greater than 250 microns can be removed by using (i.e. passing the fly ash through) at least one screen having a mesh size between about 75 and about 250 microns to remove at least said fly ash particles having a particle size of greater than 250 microns. Alternatively, the fly ash particles can be air classified to remove at least said fly ash particles having a particle size of greater than 250 microns.

In yet another embodiment of the invention, the present invention comprises a method for producing a polymer composite, comprising the step of selecting a fly ash filler for use in the polymer composite or modifying a fly ash filler for use in the polymer composite to have a particle size distribution with at least three modes to increase the packing factor of the fly ash filler and to improve the mechanical properties of the polymer composite. Typically, the fly ash filler will have three modes. The polymer can also be selected to have good compatibility with the fly ash filler to improve the mechanical properties of the polymer composite.

These and other features and advantages of the present invention will become more readily apparent to those skilled in the art upon consideration of the following detailed description, which describe both the preferred and alternative embodiments of the present invention.

DETAILED DESCRIPTION OF THE INVENTION

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

As discussed above, the inventors have determined that the granulometry of fly ash fillers and filler blends is the dominant factor in determining the suitability of these fillers for use as mineral fillers in polymer composites. As is well understood to those skilled in the art, fly ash is produced from the combustion of pulverized coal in electrical power generation plants. Fly ash is formed of mineral matter that is typically of very fine particle size, ranging from less than 1 micron to over 100 microns in some cases. The fly ash particles possess a substantially spherical shape as a consequence of the high temperature melting and coalescence in the furnace of the mineral matter accompanying the coal. The fine particle size and spherical shape are advantageous properties of the fly ash and are in marked contrast to the properties of many conventional fillers such as ground limestone or calcium carbonate, which are typically relatively coarse with an irregular, blocky particle shape. These differences in granulometry between fly ash and these conventional fillers are highly significant to the present invention.

Mineralogically, fly ash is predominantly amorphous, or non-crystalline, in nature as a result of the rapid quenching of clay/shale minerals as they rapidly pass through the boiler flame and dust collection system of the power plant. For some fly ashes, the amorphous material can be described as an aluminosilicate glass similar in composition to the mineral mullite ($Al_6Si_2O_{13}$); for other fly ashes, it can be described as a calcium aluminosilicate glass similar in composition to the mineral anorthite ($CaAl_2Si_2O_8$). Fly ashes also contain smaller amounts of a variety of other mineral components derived from thermal modification of accessory minerals present in the coal. These typically include mullite, quartz ($SiO_2$), ferrite spinel ($Fe_3O_4$), hematite ($Fe_2O_3$), dicalcium silicate ($Ca_2SiO_4$), tricalcium aluminate ($Ca_3Al_2O_6$), and lime (CaO). These mineral components occur either as inclusions in the glass particles or as discrete particles.

It is commonly known that the chemical composition of fly ash changes as a result of the type of coal being burned in the boiler. These differences are largely in the relative proportions of the element calcium present in the ash. For example, high rank bituminous coals generally have a low calcium content and produce an ash with relatively low calcium, typically less than 5% as CaO; whereas low rank thermal coals generally have much higher content of calcium, typically in the range 8–20% CaO for lignite coals and 20–30% CaO, or higher, for subbituminous coals. These differences are recognized by ASTM specifications, such as ASTM C-618 that governs the use of fly ash as a pozzolan in concrete in the United States and elsewhere, and by Canadian specifications that classify the ashes based on their CaO content.

Current ASTM C-618 specifications include only two designations or classes of fly ash: "Class F" and "Class C" fly ashes. The "Class F" designation generally incorporates fly ashes originating from the combustion of bituminous and lignite coals and the "Class C" designation generally incorporates ashes from the combustion of subbituminous coals. These designations are based on the chemical composition of the fly ash in such a way that when the sum of the element oxides ($SiO_2+Al_2O_3+Fe_2O_3$) derived from chemical analysis of the ash is equal to or greater than 70% by weight, then the fly ash is designated a "Class F" fly ash. When the sum of the element oxides is equal to or greater than 50% by weight, the fly ash is designated as a "Class C" fly ash.

In Canada, as mentioned above, fly ashes have certain designations based on their CaO content. In particular, a fly ash is considered a "Class F" when it includes less than 8% CaO, a "Class CI" when it includes 8–20% CaO, and a "Class CH" when it includes greater than 20% CaO.

It is less commonly known that the particle-specific properties, or granulometry, of a fly ash also vary according to the source of the coal and the included mineral matter. In particular, this factor has a marked effect on the proportions of the fine and coarse particles present in the fly ash, also known as the particle size distribution, in concert with the surface area and particle packing characteristics. Significantly, these properties are not addressed by appropriate ASTM specifications, such as ASTM C-618, that cover the use of fly ash by industry.

Thus, fly ash is a chemically, physically and mineralogically complex material with properties that vary according to the source of the coal being burned in the power plant, as well as the combustion conditions and pollution control equipment installed at the power plant. An intimate knowledge of all these variables is essential to the successful use of fly ash as a mineral filler in polymeric products such as polymer shingles. Furthermore, it is necessary that the filled polymer-fly ash composite meets applicable quality control specifications and ASTM performance criteria.

The present invention discloses a methodology for selecting or modifying a fly ash that will allow it to be used effectively as a substitute for the conventional mineral fillers (e.g. calcium carbonate fillers) used in polymer composites. The inherent properties of fly ash, or modified fly ash, allow a more economical polymer composite to be manufactured as well as one with comparable or even superior mechanical properties and performance.

In accordance with the invention, the inventors have discovered that the granulometry of the fly ash is important in determining whether the fly ash or a blend of the fly ash and another filler can be used to produce polymer composites and to improve the properties of polymer composites. In particular, a fly ash filler is selected for use in the polymer composite having a particle size distribution with at least three modes to increase the packing factor of the fly ash filler and the mechanical properties of the polymer composite. Alternatively, the fly ash can be blended with another fly ash or with another filler to modify the properties of the fly ash to produce a fly ash having a particle size distribution with at least three modes. Typically, the fly ash filler or filler blend has a particle size distribution with three modes but can have four, five or even more modes. In accordance with the invention, a polymer having good compatibility with the fly ash filler or filler blends can be used to improve the mechanical properties of the polymer composite. For example, as discussed in related U.S. application Ser. No. 09/993,316, filed Nov. 14, 2001, the fly ash fillers of the invention can be used at higher loadings to produce greater mechanical properties in asphalt shingles, which are one type of polymer composite in accordance with the invention. For example, the fillers of the invention have been found to increase the pliability, tear strength and tensile strength of asphalt composites. It is believed that the fly ash fillers of the invention can positively improve mechanical properties of polymer composites such as stiffness, strength, impact and temperature resistance, dimensional stability, creep, surface hardness, scratch resistance, fire resistance and ultraviolet degradation. Moreover, a fly ash filler or filler blend having a loss on ignition (or carbon content) within a certain desirable range can be selected for use with the filled polymer to provide certain desired properties for the polymer composite. A fly ash filler or filler blend can also be used having a high specific gravity to provide certain properties to the polymer composite. Further, a fly ash filler or filler blend can also be used having a low oil absorption to decrease the viscosity of the filled polymer in processing.

As mentioned above, it has been determined by the inventors that a filler comprising fly ash and having a particle size distribution with at least three modes has been found to be particularly advantageous for use in filled polymers for use with polymer composites. Preferably, the particle size distribution has three to five modes and typically has three modes. Preferably, the particle size distribution includes a first mode having a median particle diameter from 0.3 to 1.0 microns, a second mode having a median particle diameter from 10 to 25 microns, and a third mode having a median particle diameter from 40 to 80 microns. In some cases, the filler can also include a coarse mode with a median particle diameter in the region of 100–200 microns and, in other cases, the filler can include an additional ultrafine mode with a median particle diameter in the region of 0.05–0.2 microns. The particle size distribution also preferably includes 11–17% of the particles by volume in the first mode, 56–74% of the particles by volume in the second mode, and 12–31% of the particles by volume in the third mode. Moreover, the ratio of the volume of particles in the second and third modes to the volume of particles in the first mode is preferably from about 4.5 to about 7.5. It may also be desirable to remove coarse particles from the filler, e.g., at least the particles having a particle size of greater than 250 microns. For example, as discussed in more detail below, at least the coarse particles having a particle size of 50 microns can be removed by various methods (e.g. screening or air classification) as long as the filler maintains a particle size distribution having at least three modes.

The filler preferably has a packing factor of at least 65%, and typically has packing factors in the range of 65% to 75% and more typically in the range of 67% to 73%. The filler of the invention can advantageously be used at filler loadings of greater than 20% to about 80% percent by weight, preferably from about 30% to about 80% by weight, and more preferably from about 40% to about 80% by weight. The filler can also be loaded in the filled polymer at filler loadings of greater than 20% to about 60% percent by volume, preferably from about 30% to about 60% by volume, and more preferably from about 40% to about 60% by volume. As a result, the fillers of the invention can be used to replace significant amounts of polymer or other fillers in the polymer composite and thus can greatly reduce the cost of the polymer composite.

The fly ash used in the filler according to the invention is a lignite fly ash, a subbituminous ash, a bituminous ash, or a blend of two or more fly ashes (e.g. a subbituminous/bituminous blend). In addition, the fly ash can be a Class C fly ash, a Class F fly ash, or a blend thereof. More preferably, the filler is a lignite fly ash or a blend of a fly ashes as discussed in more detail below. The fly ash filler typically has a carbon content of from about 0.1% to about 15% by weight and can advantageously be selected to have a carbon content of from about 1% to about 5% by weight. It has been discovered that a carbon content greater than 5% can undesirably result in high viscosities when mixed with the polymer. Although a filler having a carbon content less than 1% can advantageously be used with the invention, a carbon content of 1% or greater can, in some applications, result in a polymer composite having improved mechanical properties.

The filler of the invention can be a filler blend comprising a fly ash and at least one additional filler. In one embodiment of the invention, the filler blend can include a first fly ash and a second fly ash. For example, the filler blend can include a high fine particle content fly ash filler such as a subbituminous coal fly ash (e.g. having a median particle size of 10 microns or less) and a low fine particle content fly ash filler such as a bituminous coal fly ash (e.g. having a median particle size of 20 microns or greater). In addition, other blends of fly ashes are possible such as bituminous/lignite, lignite/subbituminous and bituminous/lignite/subbituminous blends. In addition, two or more fly ashes from the same type of coal source, e.g., two different lignite coal fly ashes, can be blended to produce the filler blend of the invention. In the filler blends, the first fly ash can be included in an amount from about 0.1% to about 99.9%, more preferably from about 10% to about 90% by weight of the filler blend and the second fly ash can be included in an amount from about 99.9% to about 0.1%, more preferably from about 90% to about 10% by weight of the filler blend. The filler blend typically has a carbon content of from about 0.1% to about 15% by weight and can advantageously be selected to have a carbon content of from about 1% to about 5% by weight as discussed above. Although the fly ash filler blend can be produced by blending two different fly ashes, the fly ash filler blend can also be formed by burning at least two different coals selected from the group consisting of bituminous coals, lignite coals and subbituminous coals, and using the resulting ash as the filler blend. For example, a subbituminous coal and a bituminous coal can be burned together to produce the filler blend.

In another embodiment of the invention, the filler can be a filler blend including fly ash and at least one additional mineral filler other than a fly ash. Suitable mineral fillers include calcium carbonate, aluminum trihydrate (ATH), milled glass, glass spheres, glass flakes, silica, silica fume, slate dust, amorphous carbon (e.g. carbon black), clays (e.g. kaolin), mica, talc, wollastonite, alumina, feldspar, bentonite, quartz, garnet, saponite, beidellite, calcium oxide, calcium hydroxide, antimony trioxide, barium sulfate, magnesium oxide, titanium dioxide, zinc carbonate, zinc oxide, nepheline syenite, perlite, diatomite, pyrophillite and the like, or blends thereof. In this embodiment, the additional mineral filler is preferably calcium carbonate and the calcium carbonate is preferably combined with a high fine particle content fly ash filler such a a lignite or subbituminous fly ash (e.g. having a median particle size of 10 microns or less). The filler blend can include from about 0.1% to about 99.9%, more preferably about 10% to about 90% by weight of the fly ash and from about 99.9% to about 0.1%, more preferably about 90% to about 10% by weight of the at least one additional filler. The fly ash can also be selected to produce a filler blend having a carbon content of from 1% to 5% by weight as discussed above or a primarily carbon-containing material (such as an amorphous carbon) can be added to the filler blend, particularly in polymer composites such as dark colored plastics where the presence of the carbon-containing material is not undesirable. When additional fillers are blended with fly ash as the filler for the polymer composite, the filler blend preferably has a particle size distribution with at least three modes as discussed above. Nevertheless, in some embodiments, the fly ash filler (and one or more additional fillers used in a filler blend) will be selected to produce the particle size distribution discussed above and a further additional filler will not be selected for this purpose.

In accordance with a preferred embodiment of the invention, the filler is a fly ash filler, a filler blend of two or more fly ashes, or a filler blend of fly ash and calcium carbonate, having the particle size distribution discussed above. In a more preferred embodiment, the filler consists essentially of a fly ash filler (either in the form of a single fly ash filler or blend of fly ash fillers) having the particle size distribution discussed above.

The fillers used in the invention can be classified to produce a filler having a particle size distribution with at least three modes as discussed above or one or more of the fillers used in the filler blend can be classified to allow the filler blend containing the filler to have a particle size distribution with at least three modes. For example, the fly ash fillers used alone or in the filler blends can be classified to produce the desired particle size distribution. For example, a high fine particle content fly ash such as a subbituminous coal ash or a high coarse particle content fly ash such as a bituminous coal ash can be air classified to provide the desired particle size distribution. In addition to air classification, the fly ash fillers can be classified using dry screening (sieving) or wet classification methods (e.g. wet screening or hydrocyclones) followed by drying of the fly ash. Alternatively, in-plant classification methods can be used. For example, the fly ash fillers can be classified electrostatically by adjusting the collection methods of the electrostatic precipitators used to recover the fly ash from the electric power generation plants. In addition, the fly ash fillers can be classified by modifying the discharge hopper selection of the fly ash from the electric power generation plants.

The polymer used in the polymer composites of the invention include not only homopolymers but also copolymers of two or more monomers and the term "polymer" as used herein includes plastics, resins, elastomers, thermoplastics, thermosets, and hot melts. Suitable polymers includes polyolefins (e.g. polyethylene or polypropylene), ethylene copolymers (e.g. ethylene-acrylic copolymers and ethylene-vinyl acetate copolymers), polystyrene, polyvinyl chloride, polyvinylidene chloride, polyvinyl acetate, polyacrylonitrile, polyamides (e.g. nylon), polyisobutylene, acrylics, polyacetals, chlorinated and fluorinated polymers (e.g. PTFE), fluoroelastomers, fluorosilicones, polycarbonates, epoxies, phenolics, polyesters, acrylic polymers, acrylate polymers, polyurethanes, alkyds, silicones, bitumen (i.e. asphalt), styrene-butadiene (SB) latices, acrylonitrile-butadiene-styrene (ABS) latices, nitrile rubber, diallyl phthalates, melamines, polybutadienes, aramids, cellulosics, cellulose acetobutyrates, ionomers, parylenes, polyaryl ethers, polyaryl sulfones, polyarylene sulfides, polyethersulfones, polyallomers, polyimides, polyamide-imides, polymethylpentenes, polyphenylene oxides, polyphenylene sulfides, polysulfones, polyetherketones, polyethermides, polyaryleneketones, polychloroprenes, and blends thereof. Preferably, the polymer includes polyethylene, polypropylene, polyvinyl chloride, nylon, epoxies, phenolics, polyesters, acrylic polymers, polyurethanes, bitumen (i.e. asphalt), styrene butadiene copolymers, acrylonitrile-butadiene-styrene copolymers, and blends thereof.

In addition to the polymer and the filler of the invention, the filled polymer used in the polymer composites can include one or more additives. Suitable additives include surfactants, blowing agents, flame retardants, pigments, antistatic agents, reinforcing fibers (e.g. glass fibers), antioxidants, preservatives, water scavengers, acid scavengers, and the like. In addition, coupling agents can be used with the fly ash fillers of the invention for certain polymers. Suitable coupling agents include silanes, titanates, zirconates and organic acids.

The polymer composites including the filled polymer of the invention can be used in carpet backing, shingles and asphaltic products, automotive products (e.g. sheet molding compounds, bulk molding compounds and injection molded thermoplastic parts), commodity and engineering plastics, pipe, conduit, polymer concrete, vinyl flooring, rubber matting and other rubber products, paints, coatings, caulks, putties, dry-wall jointing compounds, adhesives, mastics and sealants. The polymer composite can include additional materials in combination with the filled polymer as would be readily understood to those skilled in the art.

The present invention also includes a method for producing a polymer composite that includes the steps of combining a polymer with the filler discussed herein to produce a filled polymer and producing a polymer composite with the resulting filled polymer. Because the polymer is processed at an elevated temperature (e.g. 300–500° F.) to form a melt and to allow the polymer to have a workable viscosity, the filler can be preheated prior to adding it to the polymer. Advantageously, by virtue of their lower specific heats, the fly ash fillers and fly ash filler blends used in the invention can be preheated using less energy than many other fillers (e.g. calcium carbonate fillers) and thus can be processed at a lower cost. When the filler is a filler blend, each of the fillers can be added separately to the polymer but preferably the filler blend is prepared prior to being added to the polymer so the fillers can be preheated together and so the desired particle size distribution can be produced. For example, the fly ash filler and at least one additional filler can be blended together to form the filler blend prior to preheating the filler blend and combining the filler blend with the polymer. Alternatively, a fly ash blend can be formed by burning two or more types of coal selected from the group consisting of lignite coal, subbituminous coal and bituminous coal (e.g. by burning a subbituminous coal and a bituminous coal together) and used as the filler blend for the polymer composite.

As mentioned above, the molten filled polymer preferably has a sufficiently low viscosity to allow it to be processed to form the polymer composite. The molten polymer can be processed at various temperatures known in the art and is preferably processed at a temperature between 200 and 500° F. Typically, the molten polymer has a melt viscosity of about 300–5000 centipoise or more (e.g. 400 centipoise) at these processing temperatures. When the filler is added to the polymer, the melt viscosity increases. Preferably, the filled polymer has a melt viscosity below a particular threshold (e.g. about 3000–10,000 centipoise) at the desired loadings so it can be effectively processed into the polymer composite. For example, the filler of the invention can advantageously be used at filler loadings of greater than about 60% by weight, and even greater than about 70% by weight (e.g. even up to about 80% by weight) to produce the desired viscosity. The filler of the invention can also be used at filler loadings of greater than 40% by volume, greater than 50% by volume, and even up to about 60% by volume, to produce the desired viscosity. As a result, the fillers of the invention can be used to replace significant amounts of polymer in the polymer composite and thus can greatly reduce the cost of the polymer composite.

The molten filled polymer can be processed in any manner known in the art to produce the polymer composite. For example, suitable processing methods include injection molding, extrusion, pultrusion, sheet molding and the like.

In one particularly preferred embodiment, the filled polymer of the present invention is used as carpet backing. According to this embodiment, a filler according to the invention comprising fly ash and having a particle size distribution having at least three modes is combined with a polymer that is suitable for use as carpet backing, e.g., polyethylene, polypropylene, bitumen, styrene-butadiene copolymer, acrylonitrile-butadiene-styrene copolymer and blends thereof. A carpet material in accordance with this embodiment can be produced by combining the polymer with the filler of the invention (and optionally other components) to produce a filled polymer and applying the filled polymer as a melt to a surface of a carpet material at an elevated temperature to form a backing on the carpet material. It may also be preferred to remove at least the fly ash particles having a particle size of greater than 250 microns prior to combining the filler with the polymer. Advantageously, it may also be useful to remove at least the fly ash particles greater than, e.g., 150, 100, 75 or 50 microns, depending on the application and the fly ash being used. The removal of coarse particles can reduce equipment wear and tear and improve processability. For example, the fly ash particles can be passed through at least one screen having a mesh size between about 75 and about 250 microns to remove at least the fly ash particles having a particle size of greater than 250 microns. In this embodiment, 40, 60, 80, 100 or 200 mesh screens are typically used. Alternatively, the fly ash particles can be air classified to remove at least the fly ash particles having a particle size of greater than 250 microns. Typically, the filled polymer is formed into filled polymer pellets for ease of transportation, storage and handling. These pellets are subjected to an elevated temperature typically through extrusion to produce a filled polymer melt that can be applied to the surface of the carpet material. The filler is typically included in the carpet backing at a filler loading of greater than 55% by weight, more preferably greater than 60% by weight.

The present invention will now be further demonstrated by the following non-limiting examples.

EXAMPLE 1

Methodology

The inventors have examined and compared fly ash fillers from a wide range of sources and with a wide range of compositions along with commercially available calcium carbonates typically used as fillers by the polymer composite industry. By way of example, the present disclosure provides information on the following materials: two commercially available sources of calcium carbonate currently used in polymer composites (CC01 and CC02); two fly ashes derived from bituminous coals (FA01 and FA02); three fly ashes derived from lignite coals (FA03, FA04 and FA05); and two fly ashes derived from subbituminous coals (FA06 and FA07). An additional fly ash (FA08) was included as an example of a processed fly ash. The chemical characteristics and ASTM C-618 designations of the filler materials examined are given in Table 1.

TABLE 1

| Sample ID | Sum ($SiO_2 + Al_2O_3 + Fe_2O_3$) | ASTM C-618 Designation | Free Carbon (LOI, %) |
|---|---|---|---|
| CC01 | n/a | carbonate | |
| CC02 | n/a | carbonate | |
| FA01 | 90.2 | Class F | 2.1 |
| FA02 | 91.5 | Class F | 1.9 |
| FA03 | 81.9 | Class F | 0.2 |
| FA04 | 86.5 | Class F | 0.1 |
| FA05 | 77.9 | Class F | 0.3 |
| FA06 | 61.1 | Class C | 0.2 |
| FA07 | 55.5 | Class C | 0.5 |
| FA08 | 82.0 | Class F | 0.2 |

D-2840) and by the Le Chatelier method (ASTM C-188). The particle packing factor was determined by the oil absorption method (ASTM D-281). The specific surface area was determined by the Blaine air permeability method (ASTM C-204). Analysis of the particle size distribution of the fillers was conducted using a Horiba LA-300 laser interferometer with isopropanol dispersion media. The fly ashes were obtained from power plants using pulverized coal and electrostatic or baghouse dust collection and typically had a multimodal form of particle size distribution. In particular, this was seen to take the form of a trimodal distribution with a coarse mode centered in the region of 40–80 microns, an intermediate mode centered in the region of 10–25 microns and an ultrafine mode typically centered in the region of 0.3–1.0 microns. In some cases, a fourth coarse mode was observed in the region of 100–200 microns. The multimodal distribution was conveniently analyzed into its component parts by mathematical deconvolution using a computer program such as MATLAB® from Mathworks. The laser particle size analyzer also calculated a specific surface area based on the observed distribution. The differences between the fly ashes themselves and the carbonate fillers are illustrated in Table 2 and demonstrate the differences between the specific gravity, the specific surface areas, the particle size parameters and the packing factors for the tested fillers.

TABLE 2

| Sample ID | Specific Gravity | Specific Surface Area* ($cm^2/g$) | Median Particle Size ($\mu m$) | Finer than 5 microns (vol %) | Oil Absorption** (g/100 g) | Packing Factor** (%) |
|---|---|---|---|---|---|---|
| CC01 | 2.750 | 5,290 | 15.63 | 31.3 | 20.00 | 62.8 |
| CC02 | 2.865 | 2,050 | 25.45 | 19.4 | 17.45 | 65.0 |
| FA01 | 2.200 | 3,380 | 21.82 | 12.8 | 30.13 | 58.3 |
| FA02 | 2.290 | 3,160 | 25.22 | 12.8 | 30.13 | 57.4 |
| FA03 | 2.270 | 5,400 | 12.86 | 28.6 | 18.75 | 68.6 |
| FA04 | 2.370 | 4,850 | 15.11 | 21.4 | 15.63 | 71.5 |
| FA05 | 2.550 | 5,430 | 12.37 | 27.0 | 15.25 | 70.5 |
| FA06 | 2.760 | 6,660 | 9.46 | 39.8 | 16.25 | 67.4 |
| FA07 | 2.750 | 5,930 | 9.41 | 40.5 | 20.00 | 62.8 |
| FA08 | 2.516 | 7,690 | 2.64 | 80.2 | 25.13 | 59.5 |

*ASTM D-204
**ASTM D-281

Examination of the powders at high magnification by scanning electron microscopy (SEM) confirmed that, as is typical of such materials, all the fly ash fillers examined were substantially spherical in particle shape. The two calcium carbonate samples were characteristically highly irregular and blocky in particle shape. The fly ash fillers had a substantially greater proportion of ultrafine particles, i.e., particles having a diameter of less than 5 microns, and had a higher surface area than the calcium carbonate samples.

The granulometry of the fillers was examined by a variety of techniques. Specific gravity (true particle density) was determined using a helium comparison pycnometer (ASTM As mentioned above, the molten polymer is typically processed at a temperature of 200–500° F. at which point the melt viscosity is desirably 300–5000 centipoise or more and after adding the appropriate quantity of filler, the filled polymer thickens considerably with a resulting plastic viscosity of 3000–10,000 or more being typical in the industry. To compare the fillers tested in the present examples, a laboratory model was established to simulate the process conditions. For convenience and precision rheological runs were conducted at ambient temperature using a asphalt/linseed oil fluid system as a surrogate for molten asphalt that was adjusted to provide an unfilled baseline viscosity of 400 cps at 400–425° F. Additional analysis confirmed that the surrogate system was entirely comparable with properties of molten asphalt at a typical process temperature of 400–425° F., without the experimental problems and errors associated with handling hot asphalt. The surrogate is also analogous to polymer systems generally at their normal processing temperatures.

The rheological properties of the filled polymer fluid composites were determined using a computer controlled MC-III rheometer as described in U.S. Pat. Nos. 5,321,974 and 5,357,785. All test mixtures were examined after mixing to full dispersion before recording the stress/strain flow curves on the rheometer. Most of the fluid composites exhibited typical Bingham plastic flow at lower filler loadings, enabling the ready determination of Bingham plastic viscosity and yield stress parameters. At the higher filler loadings, many of the composites exhibited characteristic pseudoplastic flow, at which point the systems had a noticeably thicker consistency. For each filler system examined, flow curves were recorded as a function of filler loading, from which computation enabled the determination of the filler loading, expressed by weight (as Cw %) and by volume (as Cv %) required to produce a limiting composite viscosity of 6000 cps. Additional computations determined the plastic viscosity for each filled system at specific design targets, examples being 70% by weight loading (Cw=70%), 65% by weight loading (Cw=65%) and 45% by volume loading (Cv=45%). The relationships between filler loading and viscosity are provided in Table 3.

TABLE 3

| Sample ID | Cw % for 6000 cps | Cv % for 6000 cps | cps at Cw = 70% | cps at Cw = 65% | cps at Cv = 45% |
|---|---|---|---|---|---|
| CC01 | 71.6 | 47.7 | 3,303 | 2,072 | 3,800 |
| CC02 | 68.9 | 44.9 | 4,689 | 3,469 | 6,100 |
| FA01 | 63.9 | 43.7 | 19,743 | 6,640 | 8,300 |
| FA02 | 63.4 | 41.5 | 17,649 | 7,771 | 10,800 |
| FA03 | 72.6 | 54.2 | 2,559 | 1,432 | 1,600 |
| FA04 | 75.0 | 55.3 | 2,275 | 1,578 | 1,800 |
| FA05 | 74.1 | 53.2 | 3,378 | 2,447 | 3,100 |
| FA06 | 74.3 | 49.6 | 3,970 | 3,030 | 4,800 |
| FA07 | 72.2 | 46.5 | 3,970 | 2,522 | 4,600 |
| FA08 | 63.8 | 39.8 | 10,162 | 6,628 | 7,800 |

From the forgoing, it is evident that the different filled polymer composite systems can exhibit substantially different rheological properties as a function of both mineral filler type and filler loading. This is true not only for the fly ash fillers themselves, but also in comparing the fly ash fillers with the calcium carbonate fillers. It is immediately obvious that two of the fly ashes, FA01 and FA02, can be only be loaded to about 63–64% by weight of polymer to reach the target composite viscosity of 6000 cps. Allowing for differences in specific gravity, this translates into a volume loading of 41.5–43.7%, somewhat less than that for the two carbonate fillers, which achieved volume loadings of 44.9–47.7%. In comparison, fly ashes FA03–FA07 can be loaded into the polymer to a much higher degree, up to 75% by weight, before the target of 6000 cps is reached. Again, allowing for the differences in specific gravity between the materials, this translates into a volume loading that reached 55.3% in the case of FA04. This demonstrates that an optimally selected fly ash filler can be used at substantially higher loadings than the calcium carbonate fillers before excessive thickening occurs. Inspection of the data in Table 3 also shows that optimally selected fly ash fillers, such as FA03, FA04 and FA05, allow substantially higher loadings, up to 10% by volume, compared to the calcium carbonate fillers, CC01 and CC02. Higher filler loadings translate into significant cost savings, most obviously in terms of savings in raw polymer used and energy consumption.

As mentioned above, the fillers tested in this example typically possessed a trimodal particle size distribution with a coarse mode centered in the region of 40–80 microns, an intermediate mode centered in the region of 10–25 microns and an ultrafine mode typically centered in the region of 0.3–1.0 microns. The inventors have determined that the relationship between the volume percentages of the particles in each of the modes and particularly the mode ratio based on the volume of particles in modes 2 and 3 to the volume of particles in mode 1 provides a value that demonstrates the advantage of certain fillers. In particular, mode ratios in the range of 4.5–7.5 have been found to be particularly advantageous. The mode ratios for the fillers tested are provided in Table 4.

TABLE 4

| Sample ID | Mode 1 (M1) vol % | Mode 2 (M2) vol % | Mode 3 (M3) vol % | Mode Ratio (M2 + M3)/M1 |
|---|---|---|---|---|
| CC01 | 23.2 | 46.9 | 29.9 | 3.3 |
| CC02 | 14.1 | 12.4 | 73.5 | 6.1 |
| FA01 | 8.9 | 65.9 | 25.2 | 10.2 |
| FA02 | 26.6 | 67.6 | 24.5 | 11.7 |
| FA03 | 16.2 | 71.0 | 12.9 | 5.2 |
| FA04 | 11.7 | 67.4 | 20.9 | 7.5 |
| FA05 | 13.6 | 73.3 | 13.1 | 6.4 |
| FA06 | 29.7 | 57.4 | 13.0 | 2.4 |
| FA07 | 28.7 | 61.5 | 9.9 | 2.5 |
| FA08 | 16.5 | 83.5 | 0.0 | 5.1 |

It is noted that the FA06 and FA07 samples have low (M2+M3)/M1 ratios due to an excess of ultrafine particles, i.e., a lack of coarse particles. FA01 and FA02 have high ratios due to lack of fine particles, i.e., an excess of coarse particles. The FA03, FA04 and FA05 samples were found to have particularly advantageous volume loadings and included particle size distributions that included 11–17% of the particles by volume in the first mode, 67–74% of the particles by volume in the second mode, and 12–21% of the particles by volume in the third mode, to produce the desired modal ratio.

As discussed herein, the inventors have determined that the differences between the fillers are substantially ascribable to the granulometry of the fillers. One parameter that is particularly useful in this regard is the particle packing factor that shows a strong relationship to the determined plastic viscosity as is shown in Table 5.

TABLE 5

| Sample ID | Packing Factor (%) ASTM D-281 | Viscosity (cps) at Cw = 70% |
|---|---|---|
| CC01 | 62.8 | 3,303 |
| CC02 | 65.0 | 4,689 |
| FA01 | 58.3 | 19,743 |
| FA02 | 57.4 | 17,649 |
| FA03 | 68.6 | 2,559 |
| FA04 | 71.5 | 2,275 |
| FA05 | 70.5 | 3,378 |
| FA06 | 67.4 | 3,970 |
| FA07 | 62.8 | 3,970 |
| FA08 | 59.5 | 10,162 |

In this way, and in concert with the rheological data, it possible to compute the particle packing factor that will provide the lowest plastic viscosity at a specific filler loading design goal. The resulting limiting packing factors for various filler design loadings in the surrogate are collected in Table 6.

TABLE 6

| Filler Loading Design | Limiting Packing Factor |
|---|---|
| Cw = 65% | 61.1 |
| Cw = 70% | 64.1 |
| Cv = 45% | 62.3 |

Similar relationships can be established with the other granulometry parameters such as the particle size distribution and in particular, the modality of the particle size distribution.

The data provided in Table 5 demonstrates that two of the "Class F" fillers, FA01 and FA02, have very high composite plastic viscosity at the nominal loading of Cw=70%. At the same time, these two fillers have the lowest packing factors in the group. The processed fly ash, FA08, also a "Class F" fly ash according to the ASTM definition, similarly has a low packing factor and a high composite plastic viscosity. The other "Class F" fillers, FA03, FA04 and FA05, all have high packing factors and correspondingly low composite plastic viscosities. Furthermore, the inventors have shown clearly that the two ASTM "Class C" fly ashes, FA06 and FA07, can function perfectly well as fillers, as evidenced by their packing factor and plastic viscosity.

Furthermore, these fillers can improve the mechanical properties of the polymer composite when compared to polymer composites using conventional fillers. For example, as discussed in related U.S. application Ser. No. 09/993,316, filed Nov. 14, 2001, the fly ash fillers of the invention can be used at higher loadings to produce greater tear strength and tensile strength in asphalt shingles, which are one type of polymer composite in accordance with the invention.

EXAMPLE 2

Modification of Granulometry of Fly Ash to Improve Filler Characteristics

As a further illustration of the broader application of the concepts disclosed in the present invention, the inventors have demonstrated that it is possible to modify the granulometry of a fly ash through processing and/or blending in such a way that its characteristics as a mineral filler are markedly enhanced.

As an example, it will be recalled from Example 1 that fly ash FA01, designated as an ASTM "Class F" ash, does not function satisfactorily as a polymer filler as a result of a sub-optimal granulometry, whereby the particle packing factor is low (58.3%) and the composite plastic viscosity is very high (12,123 cps) at a loading of 70% by weight. Further examination by scanning electron microscopy revealed that fly ash FA01 has a relatively low population of ultrafine particles leading to a low specific surface area of 3,380 cm$^2$/g. A series of experiments was carried out where additional fine particulate material was added to FA01 using the fine processed ash FA08 with a specific surface area of 7,690 cm$^2$/g. At each addition level, the granulometry of the resulting filler blend was measured and the rheological characteristics determined using the MC-III rheometer at a nominal fixed filler content of 70% by weight. Granulometry and rheological data for the blended fillers produced with various proportions of fly ashes FA01 and FA08 are summarized in Table 7.

TABLE 7

| Sample | Specific Surface (cm$^2$/g) | Packing Factor (%) | Viscosity (cps) at Cw = 70% |
|---|---|---|---|
| 100% FA01 | 3380 | 58.3 | 12,123 |
| 90:10 FA01/FA08 | 3374 | 59.9 | 8,765 |
| 80:20 FA01/FA08 | 3759 | 60.8 | 6,651 |
| 70:30 FA01/FA08 | 4125 | 68.2 | 5,590 |
| 60:40 FA01/FA08 | 4409 | 67.9 | 5,353 |

From inspection of the results in Table 7, it is evident that as the proportion of the fine particulate fly ash FA08 increases from 0–40% by weight in the blend, both the specific surface area and the particle packing factor increase monotonically. This is accompanied by a corresponding marked, and substantially linear, decrease in the composite plastic viscosity from over 12,000 cps to a pessimum value of 5,353 cps at a 40% by weight content of fly ash FA08. This illustrates the synergistic benefits of the blending or modifying of fly ashes in accordance with the present invention, especially when it is considered that the composite plastic viscosity of the fine fly ash FA08 by itself is 10,162 cps at a filler content of 70% by weight. It is convenient to consider that, initially, the addition of fine particles in fly ash FA08 compensates for the deficiency of fine particles in fly ash FA01, thereby improving the packing. This proceeds up to a certain addition level, or pessimum, at which point the system develops an excess of fine particles or deficiency of coarse particles, with a consequent reduction in the packing efficiency.

As a second example, alternative modification of the granulometry of fly ash FA01 was carried using progressively increasing proportions of fly ash FA06, an ASTM "Class C" ash with an inherently higher content of fine particles, as shown by its specific surface area of 4,026 cm$^2$/g. As clearly shown by the data in Table 8, there was again a progressive, and substantially linear, increase in both the specific surface area and particle packing factor of the blended filler up to approximately 60% by weight of fly ash FA06. This was again accompanied by a marked reduction in the composite plastic viscosity from an initial value of 7,766 cps for the 100% FA01 down to a pessimum value of 2,206 cps for a 40:60 by weight blend of fly ashes FA01 and FA06. As in the previous example, the addition of the fine "Class C" fly ash FA06 increased the proportion of fine particles in the fly ash FA01 up to a point, occurring around 60% by weight of fly ash FA06, a point above which the system began to be deficient in coarse particles, with a consequent reduction in packing efficiency.

TABLE 8

| Sample | Specific Surface (cm$^2$/g) | Packing Factor (%) | Viscosity (cps) at Cw = 70% |
|---|---|---|---|
| 100% FA01 | 2,929 | 61.6 | 7,766 |
| 80:20 FA01/FA06 | 2,862 | 63.0 | 5,315 |
| 60:40 FA01/FA06 | 3,176 | 65.9 | 3,780 |
| 40:60 FA01/FA06 | 3,487 | 68.0 | 2,206 |
| 20:80 FA01/FA06 | 4,026 | 69.5 | 4,931 |

These modifications to the granulometry of a fly ash provide a number of significant advantages to its successful use as a mineral filler in polymer composites, including: (i) increased mineral filler loadings at a given composite viscosity, resulting in cost savings through reduced polymer consumption and reduced energy requirements; (ii) potentially unusable or uneconomic fly ash fillers could be made viable, thereby improving economics and reducing the environmental impact of fly ash that would otherwise require disposal; (iii) reduced viscosity at a given mineral filler loading, with the benefit that energy savings would accrue through lower energy consumption to heat the polymer; (iv) an expected improvement in certain mechanical properties; and (v) improved manufacturing economics.

EXAMPLE 3

Modifying the Granulometry of Calcium Carbonate with Fly Ash to Improve Filler Characteristics As discussed herein, ground limestone or calcium carbonate is the mineral filler conventionally used in many polymer composites. Because of the irregular particle size and poor particle packing properties of calcium carbonate fillers, the amount of commercially available calcium carbonate fillers that can be loaded in polymer composites is typically limited.

In another illustration of the broader application of the technology, the inventors have shown that it is possible to markedly improve the filler characteristics of commercial calcium carbonates by modifying their granulometry by blending the calcium carbonate fillers with certain selected fly ashes.

By way of example, the inventors have selected a typical commercial calcium carbonate, CC02, currently used in polymer shingle manufacture and having a low specific surface area and a deficiency of fine particles. As discussed earlier, rheological examination of this carbonate showed that it would reach a composite plastic viscosity of 6,000 cps at a loading of 68.9% by weight, corresponding to 44.9% by volume. Modification of the granulometry of carbonate CC02 was carried out by blending in progressive increments of fly ash FA06, an ASTM "Class C" ash. Inspection of the data in Table 9 shows that with increasing amounts of the blend ash FA06, there was a marked beneficial increase in the packing factor from 65% to over 70%. At the same time, the plastic composite viscosity decreased from 4,647 cps for the 100% CC02 material down to 3,112 cps for a 50:50 by weight blend of carbonate CC02 with fly ash FA06. With this kind of improvement in filler efficiency in the modified blend, the filler loading can be readily increased to 70–73% by weight, or more, before a composite viscosity of 6,000 cps is reached.

TABLE 9

| Sample | Specific Surface ($cm^2/g$) | Packing Factor (%) | Viscosity (cps) at Cw = 70% |
|---|---|---|---|
| 100% CC02 | 2050 | 65.0 | 4,647 |
| 80:20 CC02/FA06 | 2063 | 69.9 | 3,895 |
| 60:40 CC02/FA06 | 2872 | 70.2 | 3,492 |
| 50:50 CC02/FA06 | | | 3,112 |
| 100% FA06 | 6660 | 67.4 | 4,775 |

Calcium carbonate/fly ash blends can contain up to 50 wt % or more fly ash, ideally selected from ashes that possess a substantially greater proportion of ultrafine particles compared with the original calcium carbonate. These can include ASTM "Class F" and "Class C" fly ashes derived from the combustion of bituminous, lignite and subbituminous coals, and in more specific ideal cases from lignite and subbituminous coals. Alternatively, a coarse calcium carbonate can serve to increase the coarse particle content of a fly ash filler that is deficient in coarse particles. It is believed that filled polymer composites made with calcium carbonate/fly ash blends will often have improved physical properties as evidenced in pending U.S. patent application Ser. No. 09/993,316 by the increases in tear and tensile strength when these fillers are used in asphalt shingles.

As mentioned above, the mode ratio for the fillers has been found to be a particularly useful parameter in determining whether the fillers will have the desired packing factor and will provide good filler properties in the polymer composite. The mode ratios for the preferred filler blends discussed in Examples 2 and 3 are provided in Table 10 and fall within the desired range of 4.5 to 7.5.

TABLE 10

| Sample ID | Mode 1 (M1) vol % | Mode 2 (M2) vol % | Mode 3 (M3) vol % | Mode Ratio (M2 + M3/M1) |
|---|---|---|---|---|
| 60:40 FA01/FA08 | 15.8 | 66.2 | 18.0 | 5.3 |
| 40:60 FA01/FA06 | 16.4 | 61.7 | 22.0 | 5.1 |
| 60:40 CC02/FA06 | 17.7 | 37.7 | 44.6 | 4.7 |

As shown in the above examples, the fly ash fillers and filler blends used in accordance with the invention allow high filler loadings at the viscosities and temperatures conventionally used to make polymer composites and can provide improved mechanical properties compared to commercially available fillers (e.g. calcium carbonate). The inventors have found that a filler having a particle size distribution with at least three modes exhibits improved rheology and can be used at higher loadings in polymer composites and can often result in improved mechanical properties. Specifically, a particle size distribution with three modes is believed by the inventors to give optimum packing density and to produce a polymer composite having the improved mechanical properties mentioned above.

It is understood that upon reading the above description of the present invention, one skilled in the art could make changes and variations therefrom. These changes and variations are included in the spirit and scope of the following appended claims.

That which is claimed:

1. Carpet backing including a filled polymer comprising a polymer and a filler blend comprising fly ash and at least one additional filler, said filler blend having a particle size distribution having at least three modes.

2. Carpet backing according to claim 1, wherein the particle size distribution of the filler blend includes a first mode having a median particle diameter from 0.3 to 1.0 microns, a second mode having a median particle diameter from 10 to 25 microns, and a third mode having a median particle diameter from 40 to 80 microns.

3. Carpet backing according to claim 2, wherein the particle size distribution of the filler blend includes 11–17% of the particles by volume in the first mode, 56–74% of the particles by volume in the second mode, and 12–31% of the particles by volume in the third mode.

4. Carpet backing according to claim 2, wherein the ratio of the volume of particles in the second and third modes to the volume of particles in the first mode is from about 4.5 to about 7.5.

5. Carpet backing according to claim 1, wherein the at least one additional filler in the filler blend is a second fly ash.

6. Carpet backing according to claim 5, wherein the filler blend comprises a fly ash filler having a median particle size of 10 microns or less and a fly ash filler having a median particle size of 20 microns or greater.

7. Carpet backing according to claim 1, wherein the at least one additional filler in the filler blend is calcium carbonate.

8. Carpet backing according to claim 1, wherein the filler blend comprises a subbituminous coal fly ash filler.

9. Carpet backing according to claim 1, wherein the filler blend comprises a lignite coal fly ash filler.

10. Carpet backing according to claim 1, wherein the filler blend comprises a Class C fly ash.

11. Carpet backing according to claim 1, wherein the filler blend comprises a Class F fly ash.

12. Carpet backing according to claim 1 wherein the filler blend comprises a first fly ash and at least one additional filler selected from the group consisting of a second fly ash and calcium carbonate, and wherein the polymer composite comprises at least one additional filler other than the fillers included in the filler blend.

13. Carpet backing according to claim 1, wherein the polymer is selected from the group consisting of polyethylene, polypropylene, polyvinyl chloride, nylons, epoxies, phenolics, polyesters, acrylic polymers, polyurethanes, bitumen, styrene-butadiene copolymers, acrylonitrile-butadiene-styrene copolymers and blends thereof.

14. Carpet backing formed of a filled polymer comprising:

a polymer selected from the group consisting of polyethylene, polypropylene, bitumen, styrene-butadiene copolymer, acrylonitrile-butadiene-styrene copolymer and blends thereof; and filler, said filler comprising fly ash and having a particle size distribution having at least three modes.

15. The carpet backing according to claim 14, wherein the particle size distribution of the filler includes a first mode having a median particle diameter from 0.3 to 1.0 microns, a second mode having a median particle diameter from 10 to 25 microns, and a third mode having a median particle diameter from 40 to 80 microns.

16. The carpet backing according to claim 15, wherein the particle size distribution of the filler includes 11–17% of the particles by volume in the first mode, 56–74% of the particles by volume in the second mode, and 12–31% of the particles by volume in the third mode.

17. The carpet banking according to claim 15, wherein the ratio of the volume of particles in the second and third modes to the volume of particles in the first mode is from about 4.5 to about 7.5.

18. The carpet backing according to claim 14, wherein the filler is a filler blend comprising at least one additional filler and the at least one additional filler is a second fly ash.

19. The carpet backing according to claim 14, wherein the filler is a filler blend comprising at least one additional filler and the at least one additional filler is calcium carbonate.

20. The carpet backing according to claim 14, wherein the filler consists of a fly ash having a particle size distribution having at least three modes, and wherein the filled polymer comprises at least one additional filler other than said fly ash.

21. The carpet backing according to claim 14, wherein the filler comprises a first fly ash and at least one additional filler selected from the group consisting of a second fly ash and calcium carbonate, and wherein the filled polymer comprises at least one additional filler other than the fillers included in the filler blend.

22. The carpet backing according to claim 14, wherein the filler is present in the filled polymer at a filler loading of at least 55% by weight.

23. A method for producing carpet backing, comprising the steps of:

combining a polymer with a filler blend to produce a filled polymer, the filler blend comprising fly ash and at least one additional filler and having a particle size distribution having at least three modes; and producing carpet backing with the resulting filled polymer.

24. The method according to claim 23, wherein the filler blend in said combining step has a particle size distribution that includes a first mode having a median particle diameter from 0.3 to 1.0 microns, a second mode having a median particle diameter from 10 to 25 microns, and a third mode having a median particle diameter from 40 to 80 in microns.

25. The method according to claim 23, further comprising the step of classifying a fly ash to produce a fly ash filer having a particle size distribution having at least three modes prior to said combining step.

26. The method according to claim 23, further comprising the step of removing at least the fly ash particles having a particle size of greater than 250 microns prior to said combining step.

27. The method according to claim 23, wherein the filler in said combining step consists of said fly ash filler and said combining step comprises combining said fly ash filler and at least one additional filler with the polymer to produce the filled polymer.

28. The method according to claim 23, further comprising die step of blending fly ash and at least one additional filler together to produce a filler blend prior to said combining step.

29. The method according to claim 28, wherein the blending step comprises blending a first fly ash and a second fly ash.

30. The method according to claim 28, wherein the blending step comprises blending a fly ash and calcium carbonate.

31. The method according to claim 23, wherein the combining step comprises combining a polymer with a filler blend comprising a first fly ash and at least one additional filler selected from the group consisting of a second fly ash and calcium carbonate, and wherein the polymer composite comprises at least one additional filler other than the fillers included in the filler blend.

32. The method according to claim 23, wherein the combining step comprises combining a polymer with a fly ash blend formed by burning two or more types of coal selected from the group consisting of lignite coal, subbituminous coal and bituminous coal.

33. A method for producing a backing for a carpet material, comprising the steps of:

combining a polymer selected from the group consisting of polyethylene, polypropylene, bitumen, styrene-butadiene copolymer, acrylonitrile-butadiene-styrene copolymer and blends thereof with a filler to produce a filled polymer, the filler comprising fly ash and having a particle size distribution with at least three modes, and applying the filled polymer as a melt to a surface of a carpet material at an elevated temperature to form a backing on the carpet material.

34. The method according to claim 33, further combining the steps of:

forming the filled polymer produced in said combining step into filled polymer pellets; and subjecting the filled polymer pellets to an elevated temperatures to produce a filled polymer melt that is used in said applying step.

35. The method according to claim 33, further comprising the step of removing at least the fly ash particles having a particle size of greater than 250 microns prior to said combining step.

36. The method according to claim 35, wherein said removing step comprises using at least one screen having a mesh size between about 75 and about 250 microns to remove at least said fly ash particles having a particle size of greater than 250 microns.

37. The method according to claim 35, wherein said removing step comprises air classifying the fly ash particles to remove at least said fly ash particles having a particle size of greater than 250 microns.

38. The method according to claim 33, further comprising the step of classifying a fly ash into different particle size sections to produce a fly ash filler having a particle size distribution having at least three modes prior to said combining step.

39. The method according to claim 38, wherein said classifying step comprises air classifying a fly ash into different particle size sections to produce a fly ash filler having a particle size distribution having at least three modes.

40. The method according to claim 33, wherein said combining step comprises combining a filler having a particle size distribution having at least three modes and consisting of fly ash, with at least one additional filler other than said fly ash and the polymer to produce the filled polymer.

41. The method according to claim 33, wherein said combining step comprises combining a filler blend comprising a first fly ash and at least one additional filler selected from the group consisting of a second fly ash and calcium carbonate and having a particle size distribution having at least three modes with at least one additional filler other than the fillers included in the filler blend with the polymer to produce the filled polymer.

42. The method according to claim 33, wherein said combining step comprises combining the filler and the polymer at a filler loading of greater than 55% by weight to produce the filled polymer.

43. A method for producing carpet backing, comprising the steps of:

selecting a fly ash filler for use in the carpet backing or modifying a fly ash filler for use in the carpet backing to have a particle size distribution with at least three modes to increase the packing factor of the fly ash filler and to improve the mechanical properties of the carpet backing; and combining the fly ash filler with a polymer selected from the group consisting of polyethylene, polypropylene, bitumen, styrene-butadiene copolymer, acrylonitrile-butadiene-styrene copolymer and blends thereof to produce the carpet backing.

44. The method according to claim 43, wherein the selecting or modifying step comprises selecting or modifying a fly ash filler to have a particle size distribution with three modes.

* * * * *